United States Patent [19]

Weiler

[11] 4,327,848

[45] May 4, 1982

[54] SWING DOWN SPARE WHEEL TIRE CARRIER

[76] Inventor: Raywood C. Weiler, 17586 Vine St., Fontana, Calif. 92335

[21] Appl. No.: 143,972

[22] Filed: Apr. 25, 1980

[51] Int. Cl.³ .................................................. B62D 43/02
[52] U.S. Cl. ............................. 224/42.06; 224/42.21; 414/466
[58] Field of Search ............... 224/42.06, 42.21, 42.24; 414/463, 466

[56] References Cited

U.S. PATENT DOCUMENTS

| | | | |
|---|---|---|---|
| 1,641,890 | 9/1927 | Jackson | 224/42.23 |
| 1,672,356 | 6/1928 | Wasserfallen | 224/42.23 |
| 1,962,835 | 6/1934 | Pawsat | 224/42.15 |
| 2,320,856 | 6/1943 | Ehlers . | |
| 2,645,394 | 7/1953 | De Bord | 224/42.23 |
| 2,698,118 | 12/1954 | Dickason | 224/42.21 |
| 2,797,035 | 6/1957 | Rickert | 224/42.21 |
| 3,103,289 | 9/1963 | Clary . | |
| 3,283,973 | 11/1966 | Wargo | 224/42.21 |
| 3,330,455 | 7/1967 | Cooper | 224/42.06 |
| 3,343,736 | 9/1967 | Sellers | 224/42.06 |
| 3,369,683 | 2/1968 | Richards . | |
| 3,371,832 | 3/1968 | Sekino et al. | 224/42.21 |
| 3,482,749 | 12/1969 | Cooper | 224/42.24 |
| 3,669,326 | 6/1972 | Poraza | 224/42.21 |
| 3,700,130 | 10/1972 | Holdread | 414/466 |
| 3,779,580 | 12/1973 | Thelen | 224/42.06 X |
| 3,822,814 | 7/1974 | Baldi | 224/42.06 |
| 3,866,777 | 2/1975 | Staranick et al. | 224/42.06 X |
| 3,894,668 | 7/1975 | Chapman et al. | 224/42.06 |
| 4,140,255 | 2/1979 | Weiler | 224/42.06 |

FOREIGN PATENT DOCUMENTS 1196525  7/1965  Fed. Rep. of Germany ...... 414/466

OTHER PUBLICATIONS

*1978 Catalog BMC*, Blackstone Mfg. Co. Inc., 8 pages.

Primary Examiner—Stephen Marcus
Attorney, Agent, or Firm—Arnstein, Gluck & Lehr

[57] ABSTRACT

A spare wheel carrier for vehicles has a channel type support member arranged to be mounted on a vehicle bumper. A channel type tire carrier member is pivotally mounted at its lower end on the support member, with the pivotal axis being offset from the longitudinal center line of the carrier member. The support member has an abutment member at one side and a latching mechanism at the other side. The latching mechanism when tightened urges the carrier member into engagement with the abutment to lock the carrier in stored position. The carrier member is rotatable in a vertical plane and is adapted to be lowered so that the tire mounting means on the carrier member may be moved into registration with a tire resting on the ground in a vertical position.

7 Claims, 4 Drawing Figures

SWING DOWN SPARE WHEEL TIRE CARRIER

BACKGROUND OF THE INVENTION

The present invention relates to spare wheel carriers for vehicles such as travel trailers and motor homes.

More particularly, the carrier is adapted to be mounted on a bumper of such a vehicle and is arranged to support heavy weight single or dual wheels in upright position in such a manner as to permit relatively easy manipulation of the wheels for tire changing. The wheels are carried on a vertical support member which is pivoted off center so that the wheels remain in stored vertical position until manually moved from such position.

BRIEF DESCRIPTION OF A PREFERRED EMBODIMENT

Figure 1:
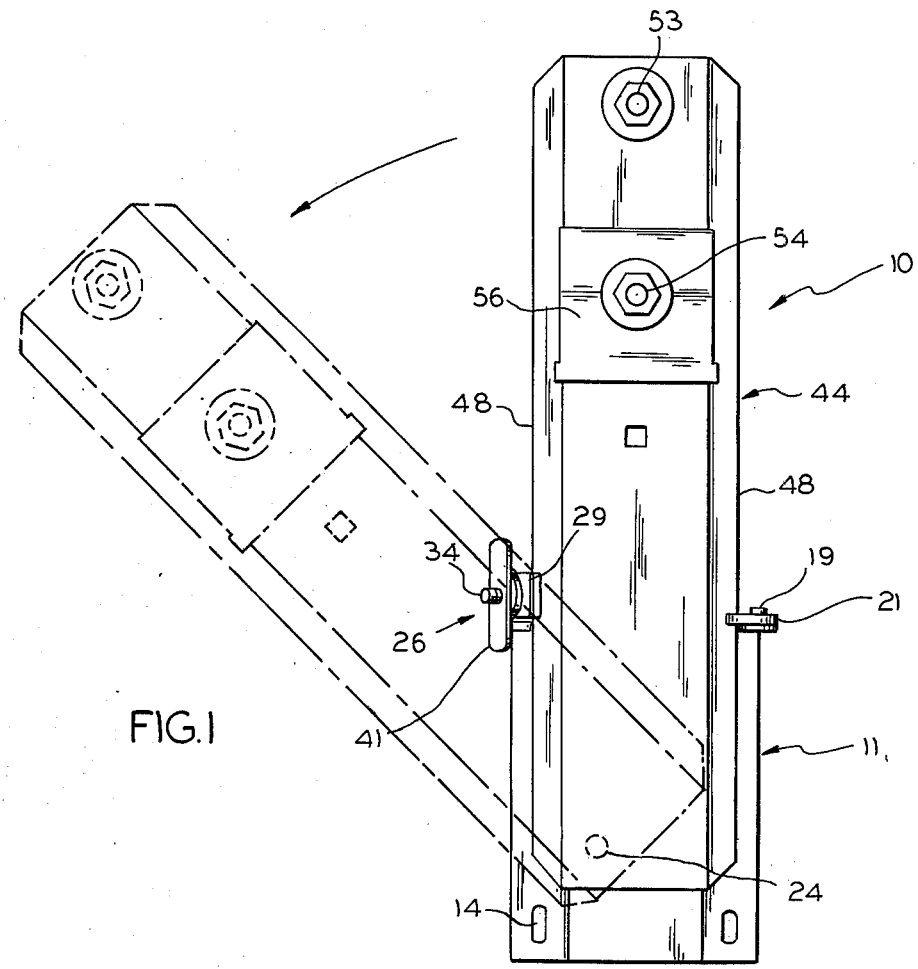
FIG. 1 is a front elevational view of a spare wheel carrier in accordance with my invention.

Referring to the drawings, the wheel carrier 10 comprises a channel support member 11 having side walls 12, 12, each provided with an outwardly extending flange 13. Each flange 13 is provided with a plurality of apertures 14, some of which are elongated and others circular, adapted to receive bolts by which the support member 11 may be secured to the bumper of a vehicle. A U-shaped bracket 16 is disposed between the side walls 12, 12 and welded thereto, with the upper flat surface of the bracket being in planar registry with the top edges of the channel member 11. A plate member 17 is superposed on the upper surface of the bracket and is secured thereto by a pair of rivets 18. Secured to the plate member 17, at one end, as with rivets 19, is an abutment member 21 provided with an angular camming edge 22. A reinforcing plate 23 bridges and is welded to the side walls 12, 12, in spaced relation to the web 11a of channel member 11. The plate 23 and web 11a are drilled to provide coaxial registering openings 25 which are offset from the longitudinal center line of the channel member 11 to receive a pin 24, as will hereinafter be described.

A latching mechanism 26 is pivotally supported on the opposite end portion of the plate member 17 for radial movement about a vertical axis. The latching mechanism includes an L-shaped bar member 27 having a horizontal leg 28 and an integral vertical leg 29. The horizontal leg 28 is provided at one end with an elongated slot 31 and the vertical leg 29 is provided with a central aperture 32 and a pair of angular wings 33, as shown clearly in FIG. 2. An L-shaped rod member 34 has its shorter vertical leg 36 passing through the slot 31 and its longer leg, the end of which is threaded, passing through the aperture 32. A coil spring 37 is circumposed axially about the L-shaped rod 34 and at one end abuts a washer 38 bridging the slot 31 and at the opposite end, abuts the vertical leg 29. The vertical leg 36 of the rod 34 which passes through the slot 31 and registering apertures in the plate member 17 and bracket 16 is secured as by a cotter pin 39. An elongated nut 41 cooperates with the threaded end of the rod and abuts a washer 43 interposed between the nut 41 and the vertical leg 29.

The tire carrier member 44 comprises an elongated channel body having a web 46 and side walls 47, 47, with each side wall having a laterally extending flange 48. At the lower end the channel, walls 47, 47 are bridged by a plate 49 which is welded to the flanges 48, 48. The plate 49 is provided with a hole which is offset from the longitudinal center line of the web 46 of the channel and the pin 24 passes therethrough and is welded both to the plate 49 and to the web 46 of the channel. The pin 24 is rotatably received in the opening 25 of the channel member 11 and is secured against inadvertent displacement by a cotter pin 51. At the upper end of the channel a bracing member 52 is welded to the flanges 48, 48.

Extending forwardly of the web 46 are a pair of studs or bolts 53, 54, each provided with a washer and a suitable nut. The bolts are arranged so as to permit selective mounting of two types of conventional wheel hubs which are to be supported on the carrier 44. A retaining member 56 formed of heavy gauge sheet metal may be selectively employed to secure one or the other types of wheels to the carrier. The manner in which the different types of wheel hubs may be secured is described in my earlier issued U.S. Pat. No. 4,140,255 and forms no part of the present invention.

Figure 2:
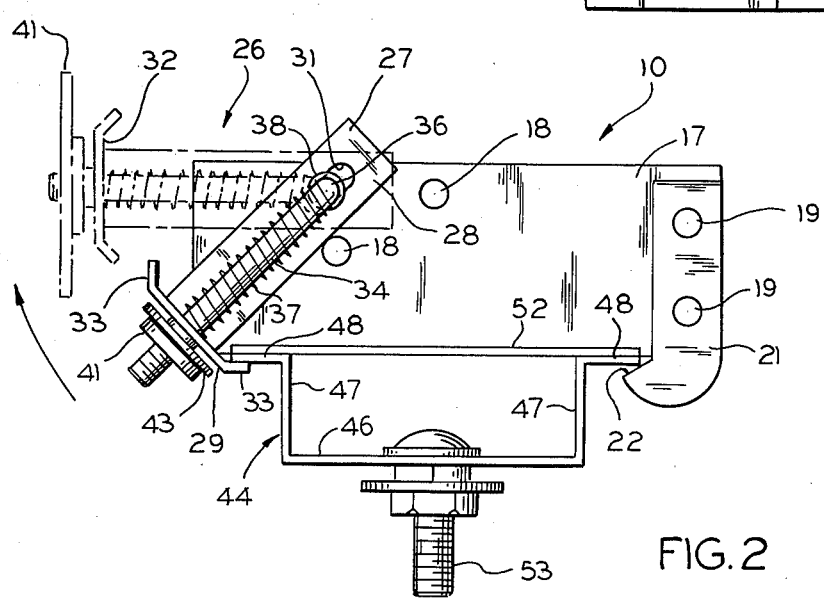
FIG. 2 is a top plan view thereof, on an enlarged scale.
Figures 3, 4:
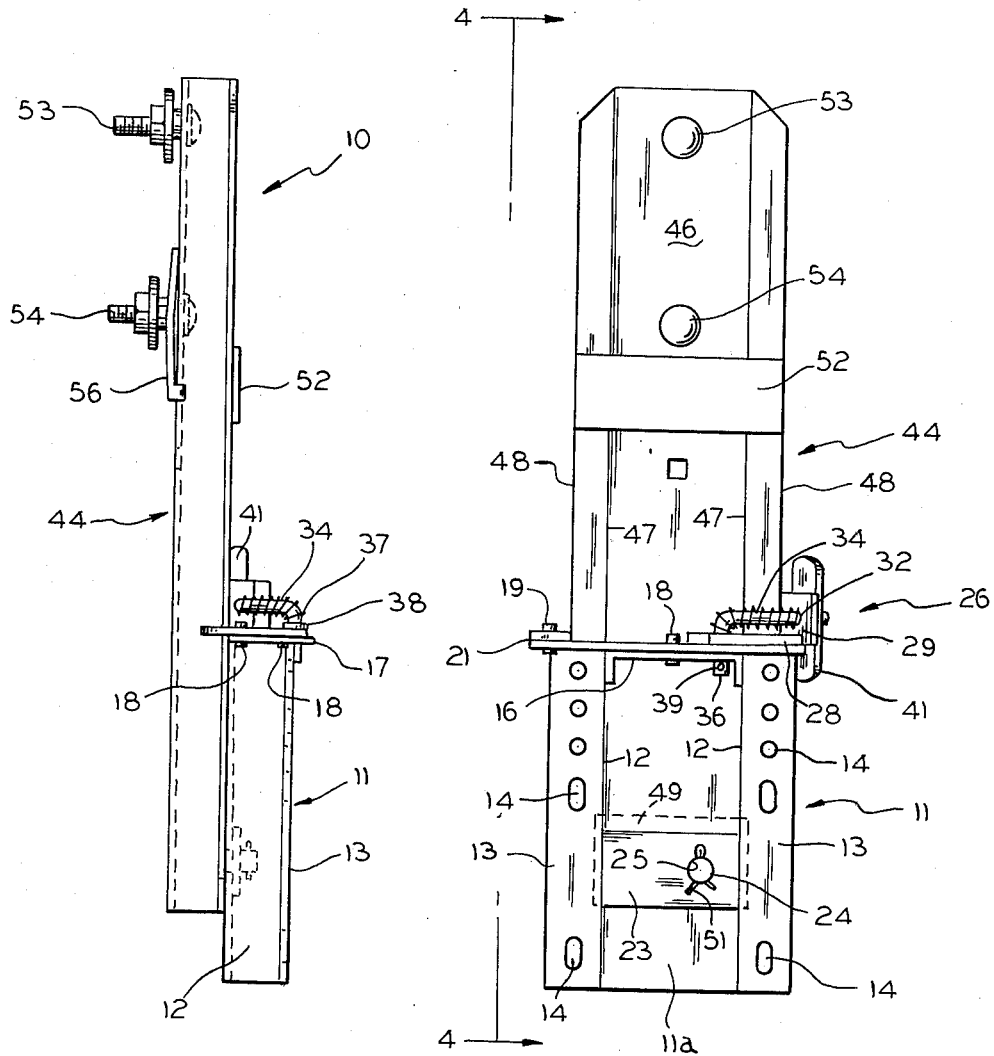
FIG. 3 is a rear elevational view thereof.
FIG. 4 is an end elevational view thereof looking in the direction of the arrows 4—4 of FIG. 3.

The support member 11 may be secured to the front or rear bumper of a vehicle by conventional means, such as by drilling holes in a bumper to receive bolts which also are passed through the corresponding holes 14 in the flanges 13 of the support member 11. As an alternative, the support member 11 may be clamped to a bumper by suitable means well known in the art. As seen in FIG. 1, the carrier member 44 may be rocked about the axis of the pin 24 when the latching mechanism 26 is released. Actually, the carrier member 44 may be rocked counterclockwise, as viewed in FIG. 1, through an arc substantially greater than 270°, beginning from the point where the flange 48 engages the abutment member 21. In any event, in order to mount a wheel on the carrier member 44, the carrier member is rocked counterclockwise to a point where one of the stud holes in the hub of the wheel, which is resting on the ground, is aligned with the upper stud 53 while the wheel is in a vertical position. Thus, the operator may easily secure the wheel to the carrier member 44 without lifting the wheel. After the wheel is so secured, the wheel and carrier member 44 are rocked clockwise, to the solid line position shown in FIG. 1, wherein the righthand edge of the flange 48, as viewed in FIG. 2, engages the camming edge 22 of the abutment member 21. The latching mechanism, which at this point occupies the position shown by the broken lines in FIG. 2, is now rocked in a counterclockwise direction to the point where the wing 33 engages the lefthand flange 48 of the member 44, as viewed in FIG. 2. Upon rotating the elongated nut 41 the wing 33 is forced into tight clamping relationship with the flange 48 of the carrier member 44 and secures the same against inadvertent dislodgement. It will be seen that because of the elongated slot 31 in the leg 28 the bar member 27 may be moved against the bias of the spring 37 to bring the wing 33 into tight clamping relationship with the flange 48 while urging the opposite flange 48 into engagement with the camming edge 22.

In order to effect dismounting of the wheel from the carrier member 44, the nut 41 is rotated to effect disengagement of the wing 33 from the flange 48 so as to permit the latching mechanism to be moved from the solid to the broken line position shown in FIG. 2. The carrier member 44 may now be rocked in a counter-clockwise direction to lower the wheel so that the tire rests on a ground surface. At this point the wheel is easily removed from the carrier member 44.

It will be apparent that the arrangement hereinabove described minimizes the effort required on the part of an operator to mount single or dual wheels on the carrier as the mounting may be effected while the wheels are on the ground, thereby avoiding manual lifting of the wheels to a point of attachment. In moving the carrier to upright position, the major portion of the weight of the wheels is carried by the pin 24, thereby substantially reducing the effort which would normally be required in lifting the wheels.

The offset positioning of the pin 24 and hole 25 in relation to the longitudinal center line of the carrier member 44 tends to urge the carrier member into engagement with the camming edge 22 thereby preventing the carrier member and tire from inadvertently dropping to a downward position when the latching mechanism is released.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. A spare wheel carrier comprising a support member adapted for mounting on the bumper of a vehicle, an elongated wheel carrier member, means for pivotally securing said wheel carrier member at its lower end to said support member, said wheel carrier member including means for mounting a vehicle wheel thereto, and being arranged to be swung in a plane parallel to said support member between a vertical upper position corresponding to the stored position of the vehicle wheel and a lowered position in which the carrier member is disposed in angular relation to said support member and in which the wheel is rested on a ground surface so that the wheel may be mounted on or dismounted from the carrier member without lifting the wheel, an abutment member carried on said support member and adapted to be engaged by said wheel carrier member when the carrier member is disposed in the vertical upper position, said pivotal securing means pivotally securing said wheel carrier member to said support member at a point offset from the longitudinal center of the carrier member such that the carrier member is normally urged into engagement with the abutment member when the carrier member is disposed in the vertical upper position, and a latching mechanism selectively engageable with said wheel carrier member to lock the carrier member in the vertical upper position, said latching mechanism including an L-shaped rod having a vertical leg pivotally supported on said support member and a horizontal leg, a retaining member having an aperture through which the horizontal leg is passed and means cooperating with said horizontal leg for urging said retaining member into engagement with said wheel carrier member.

2. The invention as defined in claim 1 in which said vertical leg of said L-shaped rod comprises a shorter leg and said horizontal leg comprises an integral elongated threaded leg overlying said support member, said latching mechanism including an L-shaped bar having an elongated horizontal leg with an elongated slot through which the shorter vertical leg of the rod is passed and a vertical leg having an aperture through which the horizontal leg of said rod is passed, the L-shaped bar being longitudinally movable relative to said L-shaped rod, and threaded means cooperating with said threaded horizontal leg to urge the vertical leg of said bar into engagement with said carrier member, said vertical leg of said bar comprising said retaining member.

3. The invention as defined in claim 2 in which the vertical leg of the L-shaped bar includes a flange arranged to engage a flange of the carrier member.

4. The invention as defined in claim 2 including a compression type coil spring circumposed about the L-shaped rod.

5. A spare wheel carrier comprising a support member adapted for mounting on the bumper of a vehicle, an elongated wheel carrier member, means for pivotally securing said wheel carrier member at its lower end to said support member, said wheel carrier member including means for mounting a vehicle wheel thereto, and being arranged to be swung in a plane parallel to said support member between a vertical upper position corresponding to the stored position of the vehicle wheel and a lowered position in which the carrier member is disposed in angular relation to said support member and in which the wheel is rested on a ground surface so that the wheel may be mounted on or dismounted from the carrier member without lifting the wheel, an abutment member carried on said support member and adapted to be engaged by said wheel carrier member when the carrier member is disposed in the vertical upper position, said abutment member having an angular camming edge adapted to be engaged by a flange of said carrier member, said pivotal securing means pivotally securing said wheel carrier member to said support member at a point offset from the longitudinal center of the carrier member such that the carrier member is normally urged into engagement with the abutment member when the carrier member is disposed in the vertical upper position, and a latching mechanism selectively engagable with said wheel carrier member to lock the carrier member in the vertical upper position.

6. The invention as defined in claim 5 in which the wheel carrier member comprises a flanged channel member having a pair of sidewalls connected by a forwardly directed web, said flange of said carrier member adapted to engage said angular camming edge being disposed on one of said sidewalls.

7. The invention as defined in claim 6 in which the wheel mounting means includes a pair of bolts in vertical alignment extending vertically of said forwardly directed web.

* * * * *